(12) United States Patent
Lin et al.

(10) Patent No.: US 8,654,535 B2
(45) Date of Patent: Feb. 18, 2014

(54) CARD HOLDER

(75) Inventors: Chih-Chiang Lin, New Taipei (TW); Ta-Chih Yu, New Taipei (TW)

(73) Assignee: Proconn Technology Co., Ltd., New Taipei (TW)

( * ) Notice: Subject to any disclaimer, the term of this patent is extended or adjusted under 35 U.S.C. 154(b) by 92 days.

(21) Appl. No.: 13/414,933

(22) Filed: Mar. 8, 2012

(65) Prior Publication Data

US 2013/0237096 A1 Sep. 12, 2013

(51) Int. Cl.
*H05K 1/14* (2006.01)

(52) U.S. Cl.
USPC .......................................... 361/737

(58) Field of Classification Search
USPC ................... 361/737; 235/492, 486; 439/483
See application file for complete search history.

(56) References Cited

U.S. PATENT DOCUMENTS

| | | | | |
|---|---|---|---|---|
| 4,007,479 A * | 2/1977 | Kowalski | ......................... | 29/760 |
| 5,276,317 A * | 1/1994 | Ozouf et al. | .................. | 235/486 |
| 5,432,682 A * | 7/1995 | Giehl et al. | ..................... | 361/796 |
| 5,563,400 A * | 10/1996 | Le Roux | ........................ | 235/486 |
| 5,655,917 A * | 8/1997 | Kaneshige et al. | ........... | 439/155 |
| 5,818,030 A * | 10/1998 | Reyes | ........................... | 235/492 |
| 5,937,359 A * | 8/1999 | Jubert | ........................... | 455/558 |
| 5,975,584 A * | 11/1999 | Vogt | ................................. | 283/98 |
| 6,097,605 A * | 8/2000 | Klatt et al. | .................... | 361/737 |
| 6,241,557 B1 * | 6/2001 | Reichardt | ..................... | 439/637 |
| 6,264,506 B1 * | 7/2001 | Yasufuku et al. | ............. | 439/638 |
| 6,421,246 B1 * | 7/2002 | Schremmer | .................. | 361/737 |
| 6,554,193 B1 * | 4/2003 | Fehrman et al. | .............. | 235/488 |
| 6,594,154 B1 * | 7/2003 | Brewer et al. | ................. | 361/801 |
| 6,717,801 B1 * | 4/2004 | Castell et al. | ............ | 361/679.41 |
| 6,766,952 B2 * | 7/2004 | Luu | ................. | 235/451 |
| 6,865,086 B2 * | 3/2005 | Gochnour et al. | ............ | 361/737 |
| 7,025,623 B2 * | 4/2006 | Katsumata et al. | ........... | 439/483 |
| 7,125,258 B2 * | 10/2006 | Nakakubo et al. | .............. | 439/64 |
| 7,183,636 B1 * | 2/2007 | Boccia et al. | ................. | 257/679 |
| 7,300,314 B2 * | 11/2007 | Kim | ............... | 439/630 |
| 7,364,439 B2 * | 4/2008 | Lin | ............................. | 439/76.1 |
| 7,673,805 B2 * | 3/2010 | Onishi et al. | .................. | 235/486 |
| 8,092,257 B2 * | 1/2012 | Hubert et al. | ................. | 439/638 |
| 8,154,878 B2 * | 4/2012 | Wang et al. | ................... | 361/754 |
| 8,337,239 B2 * | 12/2012 | Holmes | ......................... | 439/483 |
| 8,446,728 B1 * | 5/2013 | McDonald | .................... | 361/737 |
| 8,456,852 B2 * | 6/2013 | Xiao et al. | .................... | 361/752 |
| 2002/0076954 A1 * | 6/2002 | Chen et al. | ................... | 439/76.1 |
| 2013/0252470 A1 * | 9/2013 | Lin et al. | ....................... | 439/630 |

FOREIGN PATENT DOCUMENTS

FR 2881310 * 1/2005

* cited by examiner

*Primary Examiner* — Neil Abrams

(57) ABSTRACT

A card holder adapted for converting a micro SIM card into a standard SIM card in size and shape includes an insulating housing of a flat board shape which is in accordance with the standard SIM card in size and shape, and defines a card groove in accordance with the micro SIM card in size and shape and in accordance with the standard SIM card in contact position for receiving the micro SIM card in place. At least one elastic part is disposed in a positioning fillister of the insulating housing opened in one groove sidewall of the card groove, and elastically stretches into the card groove to resist against one end of the micro SIM card for securing the micro SIM card in the card groove. By using the card holder, the micro SIM card can be converted into the standard SIM card in size and shape.

5 Claims, 3 Drawing Sheets

CARD HOLDER

BACKGROUND OF THE INVENTION

1. Field of the Invention

The present invention relates to a card holder, and more particularly to a card holder adapted for converting a micro SIM card into a standard SIM card in size and shape.

2. The Related Art

With the development of information technology, mobile phones have been widely used in our lives. When the mobile phone is used, it needs to install a SIM card therein. The SIM card is an identity card for a mobile phone user in order to realize the information transmission of the communication network. At present, the mobile phone generally uses a standard SIM card as the identity card. However, with the development of the mobile phone tending to thin and small configuration, a micro SIM card having a smaller size than that of the standard SIM card comes with the tide of fashion. The standard SIM card often fails to be used in the mobile phone which is designed for receiving the micro SIM card therein. In order to meet the need of actual use, the mobile phone user has to cut the standard SIM card into the micro SIM card in size and shape. However, the standard SIM card is easily damaged in the process of being cut. Besides, after changing the size of the standard SIM card in accordance with that of the micro SIM card, the changed SIM card can't be reused in the mobile phone adapted for receiving the foregoing standard SIM card therein. As a result, it brings loss and inconvenience to the mobile phone user.

SUMMARY OF THE INVENTION

Accordingly, an object of the present invention is to provide a card holder adapted for converting a micro SIM card into a standard SIM card in size and shape. The card holder includes an insulating housing of a flat board shape which is in accordance with the standard SIM card in size and shape, and defines a card groove in accordance with the micro SIM card in size and shape and in accordance with the standard SIM card in contact position for receiving the micro SIM card in place. At least one groove sidewall of the card groove defines at least one positioning fillister. At least one elastic part is disposed in the positioning fillister of the insulating housing and elastically stretches into the card groove to resist against one end of the micro SIM card so as to secure the micro SIM card in the card groove.

As described above, by using the card holder, the micro SIM card can be conveniently converted into the standard SIM card in size and shape. As a result, the micro SIM card not only can be used in a mobile phone which is designed for receiving the micro SIM card, but also can be used in a mobile phone adapted for receiving the standard SIM card therein after being assembled in the card holder.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
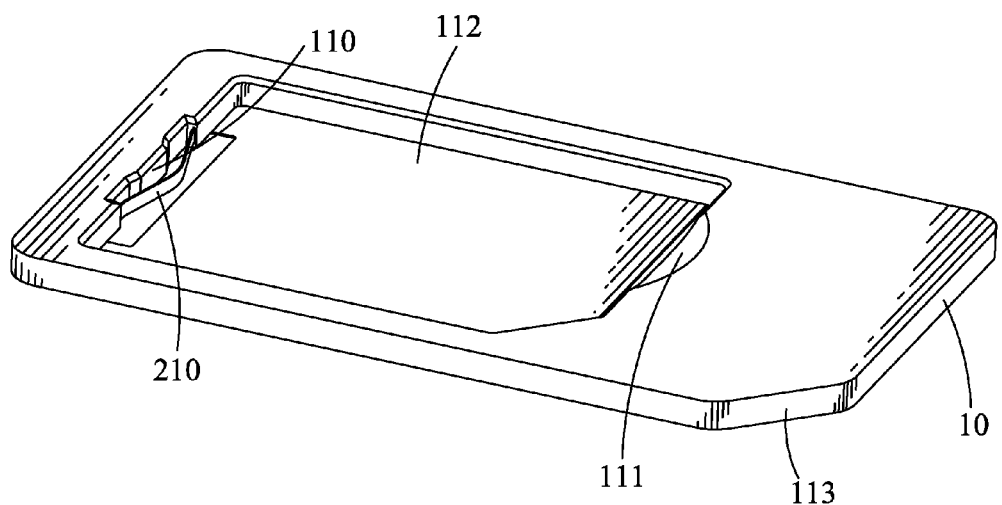
FIG. 1 is an assembled perspective view of a card holder in accordance with an embodiment of the present invention.
Figure 2:
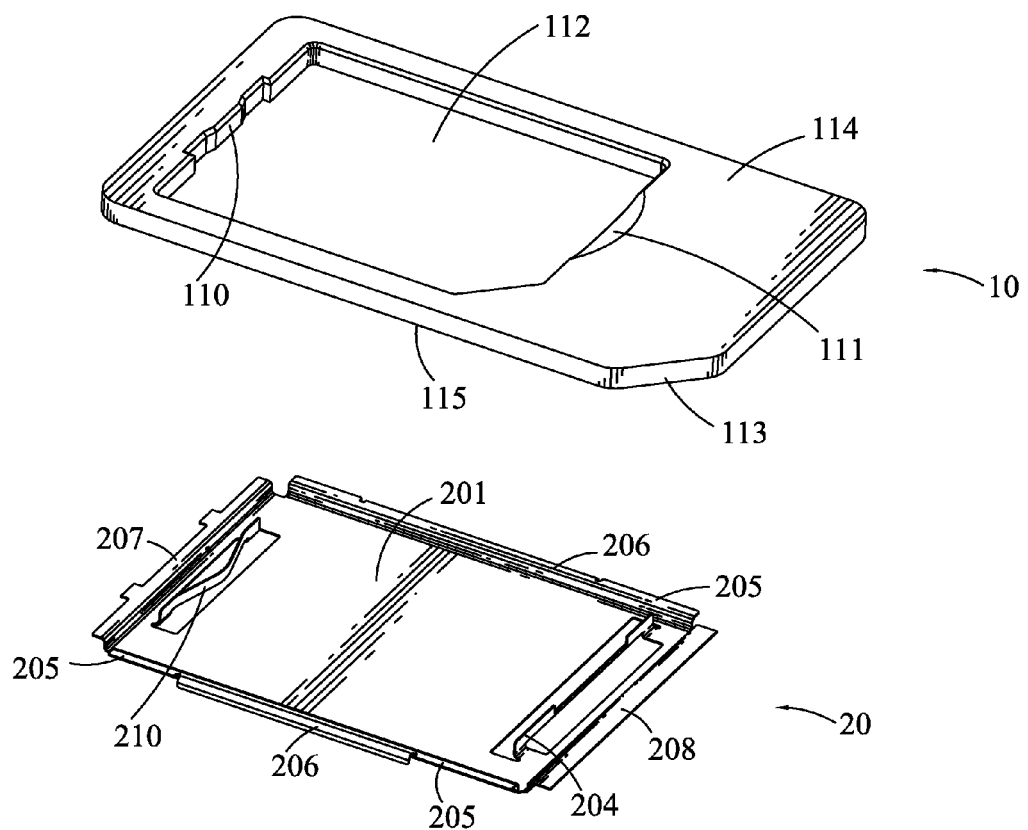
FIG. 2 is an exploded perspective view of the card holder shown in FIG. 1.
Figure 3:
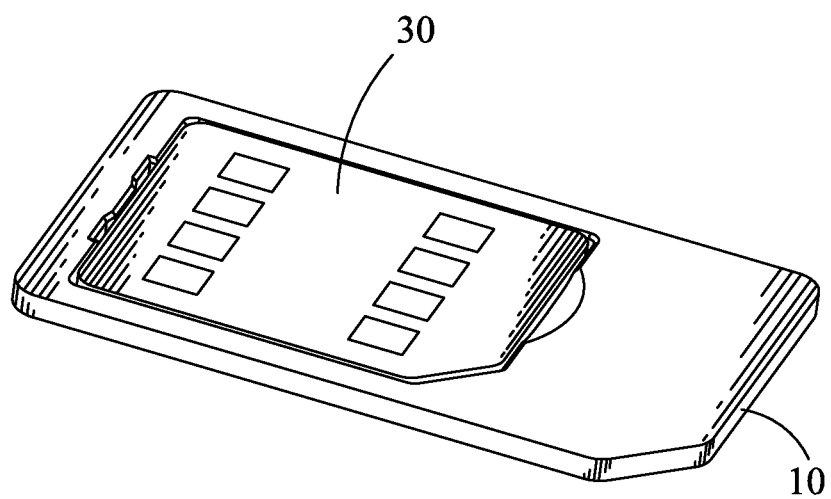
FIG. 3 is a use perspective view showing that a micro SIM card is assembled in the card holder shown in FIG. 1.

Referring to FIGS. 1-3, a card holder 100 according to an embodiment of the present invention is adapted for converting a micro SIM card 30 into a standard SIM card (not shown) in size and shape, and includes an insulating housing 10 and at least one elastic part 210.

Referring to FIG. 2, the insulating housing 10 is of a flat board shape in accordance with the standard SIM card in size and shape, and defines a card groove 112 in accordance with the micro SIM card 30 in size and shape and in accordance with the standard SIM card in contact position for receiving the micro SIM card 30 in place. The card groove 112 penetrates through a top surface 114 and a bottom surface 115 of the insulating housing 10. At least one groove sidewall of the card groove 112 defines at least one positioning fillister 110. One corner of the insulating housing 10 is designed with a slant face 113 according to the shape of the standard SIM card. The groove sidewall of the card groove 112 close to the slant face 113 defines a grasping gap 111 penetrating through the top surface 114 of the insulating housing 10 for the convenience of taking the micro SIM card 30 out of the card groove 112 therethrough. The positioning fillister 110 is opened in the groove sidewall of the card groove 112 opposite to the grasping gap 111.

Referring to FIG. 1 and FIG. 3, the elastic part 210 is disposed in the positioning fillister 110 of the insulating housing 10 and elastically stretches into the card groove 112 to resist against one end of the micro SIM card 30 so as to secure the micro SIM card 30 in the card groove 112. In detail, the elastic part 210 is of a long strip shape of which two ends are molded in two opposite fillister sidewalls of the positioning fillister 110 of the insulating housing 10 and a middle portion is arched into the card groove 112.

Referring to FIG. 1, FIG. 2 and FIG. 3 again, the card holder 100 further includes a metal part 20 molded in the insulating housing 10. The metal part 20 has a bottom plate 201 with a plurality of fastening portions protruding around a periphery side thereof. The periphery side of the bottom plate 201 is molded in the groove sidewalls of the card groove 112 to make the bottom plate 201 exposed in the card groove 112 and further flush with the bottom surface 115 of the insulating housing 10 for supporting the micro SIM card 30 thereon. The fastening portions are molded in the insulating housing 10 around the card groove 112 to secure the metal part 20 and the insulating housing 10 together. In detail, the two long sides of the bottom plate 201 bend upward and then outward to form a pair of first fastening portions 205. A middle portion of the first fastening portion 205 further bends downward to form a second fastening portion 206. The two short sides of the bottom plate 201 bend upward and then protrude outward to form a third fastening portion 207 and a fourth fastening portion 208 respectively. One end of the bottom plate 201 is die-cut upward to form a fastening slice 204 integrated in the insulating housing 10 to further secure the metal part 20 and the insulating housing 10 together. The elastic part 210 is formed at the other end of the bottom plate 201 and disposed in the positioning fillister 110 of the insulating housing 10 in the method of insert molding.

As described above, the card holder 100 includes the insulating housing 10 of the flat board shape which is in accordance with the standard SIM card in size and shape, and defines a card groove 112 in accordance with the micro SIM card 30 in size and shape and in accordance with the standard SIM card in contact position for receiving the micro SIM card 30 in place. Furthermore, the elastic part 210 is disposed in the positioning fillister 110 of the insulating housing 10 opened in the groove sidewall of the card groove 112, and elastically stretches into the card groove 112 to resist against the one end of the micro SIM card 30 so as to secure the micro SIM card 30 in the card groove 112. By using the card holder 100, the micro SIM card 30 can be conveniently converted into the standard SIM card in size and shape. As a result, the micro SIM card 30 not only can be used in the mobile phone which is designed for receiving the micro SIM card 30 (shown in the prior art), but also can be used in the mobile phone adapted for receiving the standard SIM card therein (shown in the prior art) after being assembled in the card holder 100.

The foregoing description of the present invention has been presented for the purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A card holder adapted for converting a micro SIM card into a standard SIM card in size and shape, comprising:
   an insulating housing of a flat board shape which is in accordance with the standard SIM card in size and shape, and defines a card groove in accordance with the micro SIM card in size and shape and in accordance with the standard SIM card in contact position for receiving the micro SIM card in place, at least one groove sidewall of the card groove defining at least one positioning fillister; and
   at least one elastic part disposed in the positioning fillister of the insulating housing and elastically stretching into the card groove to resist against one end of the micro SIM card so as to secure the micro SIM card in the card groove;
   wherein the card groove penetrates through a top surface and a bottom surface of the insulating housing, the card holder further includes a metal part molded in the insulating housing, the metal part has a bottom plate with a plurality of fastening portions protruding around a periphery side thereof, the periphery side of the bottom plate is molded in the groove sidewalls of the card groove to make the bottom plate exposed in the card groove and further flush with the bottom surface of the insulating housing for supporting the micro SIM card thereon, the fastening portions are molded in the insulating housing around the card groove to secure the metal part and the insulating housing together.

2. The card holder as claimed in claim 1, wherein the elastic part is of a long strip shape of which two ends are molded in two opposite fillister sidewalls of the positioning fillister of the insulating housing and a middle portion is arched into the card groove.

3. The card holder as claimed in claim 1, wherein the two long sides of the bottom plate bend upward and then outward to form a pair of first fastening portions, a middle portion of the first fastening portion further bends downward to form a second fastening portion, the two short sides of the bottom plate bend upward and then protrude outward to form a third fastening portion and a fourth fastening portion respectively.

4. The card holder as claimed in claim 1, wherein one end of the bottom plate is die-cut upward to form a fastening slice integrated in the insulating housing to further secure the metal part and the insulating housing together, the elastic part is formed at the other end of the bottom plate and disposed in the positioning fillister of the insulating housing in the method of insert molding.

5. The card holder as claimed in claim 1, wherein one corner of the insulating housing is designed with a slant face according to the shape of the standard SIM card, the groove sidewall of the card groove close to the slant face defines a grasping gap penetrating through the top surface of the insulating housing for the convenience of taking the micro SIM card out of the card groove therethrough, the positioning fillister is opened in the groove sidewall of the card groove opposite to the grasping gap.

\* \* \* \* \*